(12) United States Patent
Cross et al.

(10) Patent No.: US 10,821,538 B2
(45) Date of Patent: Nov. 3, 2020

(54) SYSTEM AND METHOD OF UNLOCKING FEATURES AND PARAMETERS IN A WELDING OR CUTTING SYSTEM USING A PHYSICAL KEY

(71) Applicant: LINCOLN GLOBAL, INC., Santa Fe Springs, CA (US)

(72) Inventors: Charles Cross, Euclid, OH (US); Michael Relko, Euclid, OH (US)

(73) Assignee: LINCOLN GLOBAL, INC., Santa Fe Springs, CA (US)

( * ) Notice: Subject to any disclaimer, the term of this patent is extended or adjusted under 35 U.S.C. 154(b) by 298 days.

(21) Appl. No.: 15/949,673

(22) Filed: Apr. 10, 2018

(65) Prior Publication Data

US 2019/0308269 A1 Oct. 10, 2019

(51) Int. Cl.
| | | |
|---|---|---|
| *B23K 9/10* | (2006.01) | |
| *B23K 9/095* | (2006.01) | |
| *B23K 9/32* | (2006.01) | |
| *B23K 9/167* | (2006.01) | |
| *B23K 9/173* | (2006.01) | |
| *B23K 9/013* | (2006.01) | |
| *B23K 9/18* | (2006.01) | |

(52) U.S. Cl.
CPC ............ *B23K 9/1062* (2013.01); *B23K 9/013* (2013.01); *B23K 9/0953* (2013.01); *B23K 9/1006* (2013.01); *B23K 9/167* (2013.01); *B23K 9/173* (2013.01); *B23K 9/18* (2013.01); *B23K 9/321* (2013.01)

(58) Field of Classification Search
CPC .... B23K 9/1062; B23K 9/013; B23K 9/1006; B23K 9/0983; B23K 9/321; B23H 1/02; B23H 7/20
See application file for complete search history.

(56) References Cited

U.S. PATENT DOCUMENTS

| | | | |
|---|---|---|---|
| 4,937,863 | A | 6/1990 | Robert |
| 4,993,627 | A * | 2/1991 | Phelan .................... B60R 25/04 307/10.5 |
| 5,667,704 | A | 9/1997 | Kolodziej |
| 5,808,885 | A | 9/1998 | Dew |
| 5,905,860 | A | 5/1999 | Olsen et al. |
| 5,923,756 | A | 7/1999 | Shambroom |

(Continued)

FOREIGN PATENT DOCUMENTS

| | | |
|---|---|---|
| DE | 29617200 | 11/1997 |
| EP | 0865858 | 9/1998 |

(Continued)

OTHER PUBLICATIONS

Quinn et al., "A Welding Cell With It's Own Website," Welding Journal, Jan. 1, 2010, XP000931841. http://www.isd.mel.nist.gov/documents/quinn/Welding_cell.pdf. Estimated Oct. 13, 2010, pp. 1-9.

(Continued)

*Primary Examiner* — Geoffrey S Evans
(74) *Attorney, Agent, or Firm* — Brad C. Spencer (57) ABSTRACT

A system and method are provided for using a welding or cutting system that uses a physical key to lock or unlock welding parameters or operations. The key can be used to lock, unlock, store and track welding or cutting information and can be customized as needed.

19 Claims, 5 Drawing Sheets

(56) References Cited

U.S. PATENT DOCUMENTS

| | | |
|---|---|---|
| 5,923,707 A | 9/1999 | Huang |
| 5,937,414 A | 10/1999 | Souder |
| 6,024,273 A | 2/2000 | Ludewig |
| 6,051,805 A | 4/2000 | Vaidya |
| 6,091,048 A | 7/2000 | Lanouette et al. |
| 6,096,994 A | 8/2000 | Handa et al. |
| 6,281,465 B1 | 8/2001 | Muller |
| 6,415,276 B1 | 7/2002 | Heger |
| 6,479,792 B1 | 11/2002 | Beiermann |
| 6,479,793 B1 | 11/2002 | Wittmann et al. |
| 6,600,406 B1 | 7/2003 | Ha |
| 6,605,800 B1 | 8/2003 | Schick |
| 6,707,003 B2 | 3/2004 | Rouault |
| 6,797,921 B1 | 9/2004 | Niedereder |
| 7,761,336 B1 | 7/2010 | Blankenship |
| 8,224,881 B1 | 7/2012 | Spear |
| 8,525,077 B2 * | 9/2013 | Peters .................. B23K 9/32 219/130.01 |
| 2002/0049803 A1 | 4/2002 | Bandhole et al. |
| 2005/0023261 A1 * | 2/2005 | Zheng ................ B23K 9/1274 219/130.5 |
| 2005/0080799 A1 | 4/2005 | Harnden et al. |
| 2005/0099498 A1 | 5/2005 | Lao et al. |
| 2005/0177823 A1 | 8/2005 | Miyake |
| 2007/0043675 A1 | 2/2007 | Birzer et al. |
| 2007/0118699 A1 | 5/2007 | Synard et al. |
| 2007/0162956 A1 * | 7/2007 | Tucker .................. G06F 11/27 726/2 |
| 2007/0244823 A1 | 10/2007 | Thomas Motley et al. |
| 2008/0027742 A1 | 1/2008 | Maeda |
| 2008/0271136 A1 | 10/2008 | Wilson et al. |
| 2008/0306786 A1 | 12/2008 | Lonowski et al. |
| 2009/0007255 A1 | 1/2009 | Grzonka |
| 2009/0031432 A1 | 1/2009 | Wakai |
| 2009/0222804 A1 | 9/2009 | Kaufman et al. |
| 2011/0114616 A1 | 5/2011 | Albrecht |
| 2011/0198329 A1 * | 8/2011 | Davidson ............. B23K 9/124 219/130.5 |
| 2012/0022882 A1 | 1/2012 | Hillen |
| 2013/0074165 A1 * | 3/2013 | Dhaene .................. G06F 21/34 726/5 |
| 2013/0075380 A1 | 3/2013 | Albrecht |
| 2014/0061169 A1 * | 3/2014 | Sammons ............. B23K 11/24 219/109 |
| 2014/0251969 A1 | 9/2014 | Stoner |
| 2014/0263247 A1 | 9/2014 | Hillen |
| 2015/0375324 A1 | 3/2015 | Becker |
| 2015/0190875 A1 * | 7/2015 | Becker .................. B23K 9/10 700/160 |
| 2015/0283652 A1 | 10/2015 | Pfeifer et al. |
| 2015/0375327 A1 | 12/2015 | Becker et al. |
| 2015/0379894 A1 | 12/2015 | Becker |

FOREIGN PATENT DOCUMENTS

| | | | |
|---|---|---|---|
| GB | 2496686 A * | 5/2013 | ........... B23K 9/1087 |
| WO | 9814300 | 4/1998 | |
| WO | 0023223 | 4/2000 | |
| WO | 0112374 | 2/2001 | |

OTHER PUBLICATIONS

Gilsinn et al., A Welding Cell that Supports Remote Collaboration, Ninth International Conference on Computer technology in Welding, Sep. 28-30, 1999. Estimated Oct. 13, 2010, pp. 1-7.

ISR dated Aug. 7, 2002 for PCT Application No. PCT /US02/1468, 2 pages.

Examiner's first report dated Mar. 13, 2007 for Australian Patent Application No. 2002318120, pp. 1-6.

European Search Report for European Application No. EP02747821 dated Mar. 19, 2009, 3 pages.

JPOA dated Jun. 20, 2008 (with translation), for Japanese Patent Application No. 2003-505814, 8 pages.

JPOA dated Nov. 20, 2009 (with translation), for Japanese Patent Application No. 2003-505814, 9 pages.

EP Examination Report dated Jul. 15, 2009 for European Patent Application No. 02-747-821.3-2221, 4 pages.

CAOA dated Aug. 11, 2010 for Canadian Patent Application No. 2,449,821, 7 pages.

Japanese Official Notice of Final Decision of Rejection, dated Apr. 5, 2011 for Japanese Patent Application No. 2003-505814, 2 pages with english translation.

Japanese Official Notice of Decision to decline the amendment dated Apr. 5, 2011 for Japanese Patent Application No. 2003-505814, 7 page with english translation.

Extended European Search Report from Corresponding Application No. 19168433.1; dated Sep. 11, 2019; pp. 1-8.

MTS; "FSW Process Experience at MTS;" http://www.mts.com/en/T echnologyShowcase/FSW /Process/index.asp; Accessed on May 11, 2009; pp. 1-2.

C-spec; "weldOffice Software Licensing;" http://www.cspec.com/csp-lic.htm; Accessed on May 11, 2009; pp. 1-2.

English Translation of Preliminary Rejection for Corresponding Application No. KR 10-2003-7016497; dated Jan. 1, 2009; pp. 1-6.

English Translation of Preliminary Rejection for Corresponding Application No. KR 10-2003-7016497; dated Jul. 29, 2009; pp. 1-6.

\* cited by examiner

SYSTEM AND METHOD OF UNLOCKING FEATURES AND PARAMETERS IN A WELDING OR CUTTING SYSTEM USING A PHYSICAL KEY

FIELD OF THE INVENTION

Devices, systems, and methods consistent with the invention relate to controlling welding/cutting operations and unlocking features or parameters in welding/cutting systems within the use of physical keys.

BACKGROUND OF INVENTION

As welding and cutting technologies and applications have advanced, these systems and power supplies have increased in complexity and functionality. However, this increased flexibility and functionality can be an issue in situations where specific or particular welding or cutting parameters must be followed. For example, there may be times where it is desired to limit the functionality or parameter selection in welding/cutting operations to prevent a user from making a change that would adversely affect the welding operation. In many current systems a user has access to all availability functionality which would allow the user to make process changes that may not be desired or will result in deficient work product. Therefore, in certain situations, it is desirable to prevent this activity and/or limit the user accessibility of the system.

Further limitations and disadvantages of conventional, traditional, and proposed approaches will become apparent to one of skill in the art, through comparison of such approaches with embodiments of the present invention as set forth in the remainder of the present application with reference to the drawings.

BRIEF SUMMARY OF THE INVENTION

Embodiments of the present invention include welding and/or cutting systems which use a physical key to lock or unlock functionality for a user. The key can be used to unlock functionality changes or limit access to functionality or changes. Further, the key can be used to store operational and user information that can be accessed later.

BRIEF DESCRIPTION OF THE DRAWINGS

The above and/or other aspects of the invention will be more apparent by describing in detail exemplary embodiments of the invention with reference to the accompanying drawings, in which.

DETAILED DESCRIPTION OF EXEMPLARY EMBODIMENTS

Reference will now be made in detail to various and alternative exemplary embodiments and to the accompanying drawings, with like numerals representing substantially identical structural elements. Each example is provided by way of explanation, and not as a limitation. In fact, it will be apparent to those skilled in the art that modifications and variations can be made without departing from the scope or spirit of the disclosure and claims. For instance, features illustrated or described as part of one embodiment may be used on another embodiment to yield a still further embodiment. Thus, it is intended that the present disclosure includes modifications and variations as come within the scope of the appended claims and their equivalents.

Figure 1:
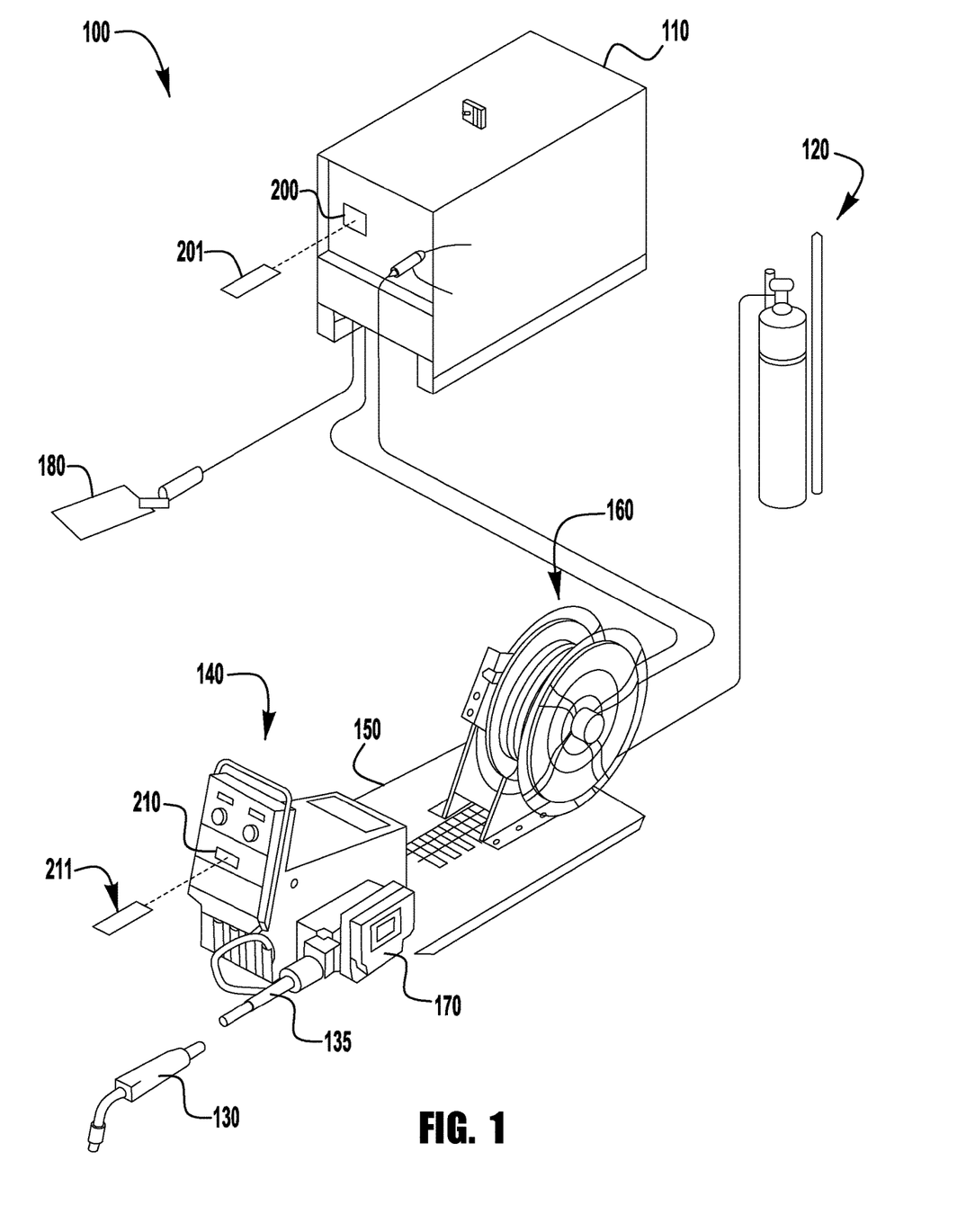
FIG. 1 illustrates a diagrammatical representation of an overall welding system in accordance with an exemplary embodiment of the present invention.

Turning now to the figures of the present application, FIG. 1 depicts an exemplary welding system 100 in accordance with an embodiment of the present invention. The welding system 100 can be any known type of welding system which employs a welding power supply and a wire feeder coupled to the power supply. For example, the welding system can be a MIG type welding system. The embodiments discussed below will generally be described as a MIG welding system, but this is intended to be only exemplary, as embodiments of the preset invention can be employed in other types of welding systems, including for example GTAW, FCAW, SAW, stick, etc. Because MIG type welding systems are well known, the coupling of the system (e.g., wire feeder) to the welding torch and workpiece is not shown for clarity. That aspect of the embodiments of the present invention are not changed and thus need not be shown or discussed in detail herein. In further exemplary embodiments, the system can include a remote control and/or a pendant control device (which are generally known) which utilizes known communication methodologies. It further should be noted that while the exemplary embodiments described herein are described as welding systems, embodiments of the present invention can also be used in other systems, such as plasma cutting, etc., and as an extension, other components can be used, instead of a wire feeder and welding power supply as described herein. That is, the power supply can be a cutting power supply, power generator with a load, etc. The systems are described herein as welding for simplification and efficiency, but embodiments herein are not limited thereto. Further, the communication circuitry, systems, methods and protocols described herein can be incorporated into these types of other systems by those of skill in the art.

Turning now to the system 100, as is typical, the system 100 contains a power supply 110 coupled to a wire feeder 140 via welding cables 150. The power supply 110 can be configured like known welding power supplies, with the additional features and attributes discussed herein. For example, in embodiments of the present invention, the power supply 110 can be configured like the Power Wave® welding systems manufactured by The Lincoln Electric Co. of Cleveland, Ohio. Further, the wire feeder 140 can be configured like known wire feeders, with the additions discussed herein, an example of which is the PF-84 series wire feeders manufactured by The Lincoln Electric Company of Cleveland, Ohio. Of course other power supplies and wire feeders can be used and these references are intended to be merely exemplary.

As is general known, the power supply 110 outputs a welding current, which is directed to the wire feeder 140, via the cables 150, so that the wire feeder can pass the current on to a welding electrode for welding a workpiece. In a MIG system the electrode is also the consumable, and in other processes, such as TIG, the electrode is not the consumable deposited into the weld. The cables 150 are the main welding power cables which deliver the welding power/current from the output studs 111/112 (see FIG. 2) of the power supply 110 to the wire feeder 140. As with known systems, the wire feeder 140 and the power supply 110 can communicate with each other both prior to, after and during welding. Often these communications are related to welding parameters, set points, feedback, etc. As explained previously in known systems, the welding systems use dedicated communication cables/lines between the power supply 110 and the wire feeder 140.

As is generally understood, the power supply 110 receives an AC signal as its input (not shown in FIG. 1). The AC signal can be received as a 3-phase input, or a single phase AC input signal. The AC signal can vary in voltage and frequency depending on the source of power and/or the country of operation. For example, the AC input can be from a utility grid—which can range from 100 to 660 volts at 50 or 60 Hz—or can be from a portable generator, which can also have a varying voltage and frequency. Thus, the system 100 is capable of operating properly and providing a welding or cutting signal regardless of the input AC voltage magnitude, phase type and frequency. The power supply 110 is designed to run in various modes including constant voltage (CV) and constant current (CC) modes, as suitable in various applications. Thus, the power supply 110 can include additional electrical components to condition the raw AC signal received and output the desired welding signal.

In most exemplary embodiments, the power from the power supply 110 is suitable for welding and is transmitted to the wire feeder 140 via the welding cables 150—which are large diameter electrical conduits. Thus, in exemplary embodiments of the present invention, the welding signal (i.e., the current signal sent to the contact tip that is actually used for welding) is originally generated, controlled and modified within the power supply 110, and then communicated via welding cables 150 to the wire feeder 140. In addition to feeding a welding electrode, the wire feeder 140 passes on the received welding signal to the arc using cables.

In many applications the power supply 110 is a multi-process type power supply 110 that is capable of outputting many different waveforms for welding and/or cutting. For example, the power supply is capable of having its output current and voltage adjusted as desired and is capable of numerous types of processes including pulse welding, short arc welding, STT type welding, CC welding, CV welding, etc. Therefore, for a use there are numerous different types of welding options available and there are numerous output settings that can be used. As briefly discussed above, this availability of options and multitudes of settings can be a disadvantage and or can be undesirable as it can tend to lead to lack of control over a particular user.

Figure 2:
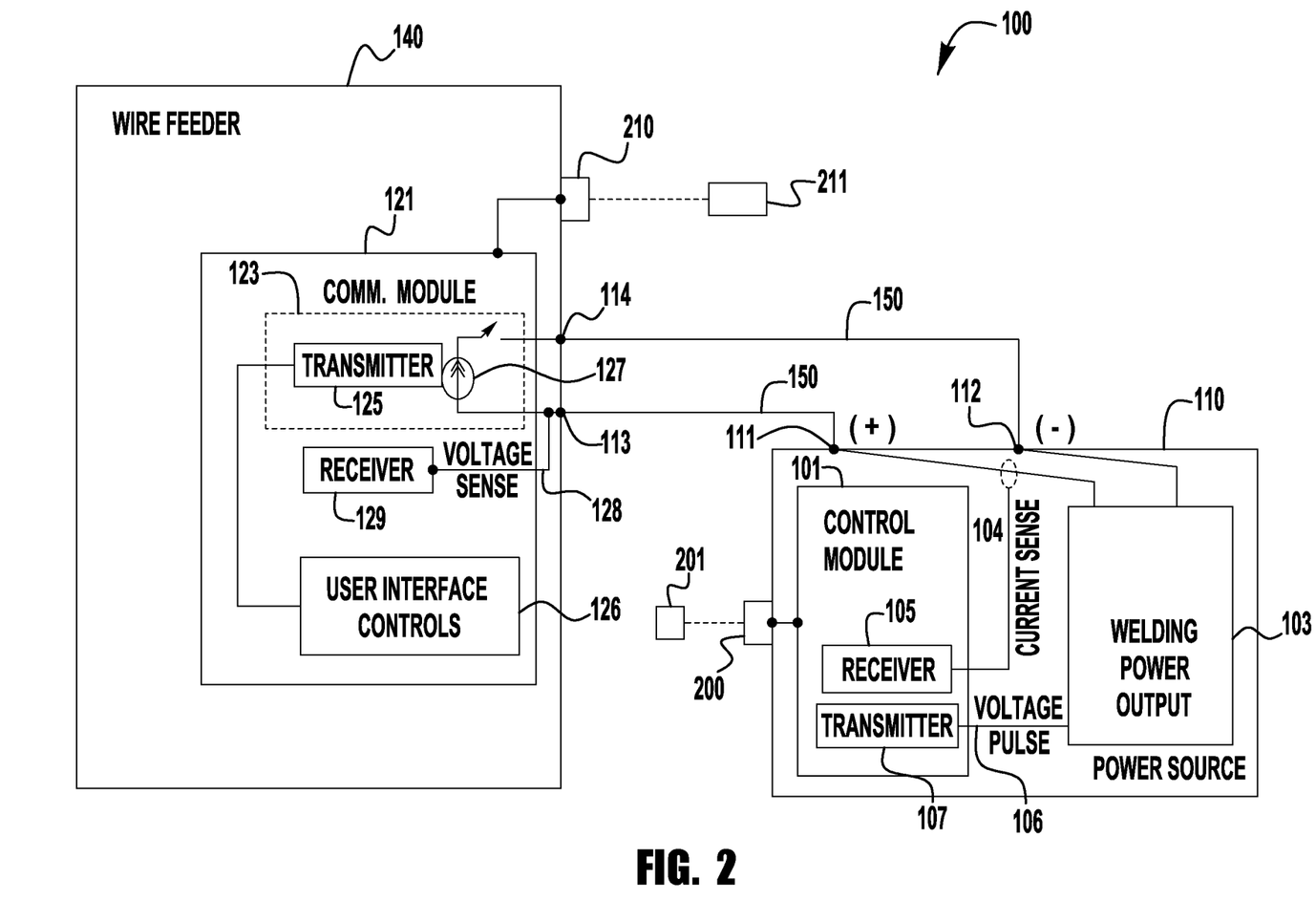
FIG. 2 illustrates a diagrammatical representation of an exemplary power supply and wire feeder of the system shown in FIG. 1.

As shown in FIG. 1, the power supply 110 has a key lock port 200 which receives a physical key 201 to unlock certain predetermined functionality on the power supply. This functionality will be described in more detail below. Further, in other alternative embodiments the wire feeder 140 can have a similar port 210 which receives a physical key 211 that unlocks certain functionality. It should be noted that in exemplary systems of the present invention the lock and key combination could be on either one of the power supply or wire feeder and need not be on both. Similarly, while not shown in FIG. 1, if a pendant is used to control an operation of the system 100 the pendant can have a key lock port that receives a key to unlock functionality. It should be noted that while two keys 201 and 211 are shown in FIGS. 1 and 2, and discussed below. Embodiments of the present invention can also use a single key that is capable of being used in either or both of the wire feeder and power supply. That is, in embodiments of the present invention, the below described functionality can be used with a single key which is compatible with either of a wire feeder and power supply in a welding system. The discussions herein of multiple keys are intended to be exemplary.

Turning now to FIG. 2, the exemplary power supply 110 contains a welding power output module 103 which generates and outputs the welding power signal to the wire feeder. The welding output module can be constructed consistent with known systems, and can contain (for example), a rectifier, a buck, boost or buck-boost circuit to generate a regulated DC bus and an output circuit, such as a chopper, PWM, inverter, etc. which is used to generate the welding signal. Of course, other known output circuits/configurations can also be used without departing from the spirit or scope of the present invention. This output module can be controlled consistent with known systems. The power supply 110 also contains a control module 101 which can be used to control the operation of the output module 103 and the power supply 110. The control module can contain a processor based computing system containing a memory, processor, etc. to control the operation of the power supply 110 consistent with known systems. Further, the control module 101 contains a receiver 105 and a transmitter 107 to facilitate communication with the wire feeder 120 consistent with the embodiments discussed herein. As shown, the receiver 105 is coupled to at least one output line of the output module 103 with a current sense lead 104 to sense an output current of the output module 103. Further, the control module 101 contains a transmitter 107 which is used facilitate the transmission of a data signal from the power supply to the wire feeder 140. The transmitter 107 is coupled to the output power module 103 via a voltage signal lead 106—the use of which will be explained further below. Of course, the power source 110 also contains additional components and electronics, such as input controls, auxiliary power, etc. which are not shown for clarity. However, as these aspects of power supplies are well known they need not be discussed in detail herein. Although not shown, the power supply can have a user interface to allow for the control or input of information for the power supply. Such systems are widely known and need not be described in detail herein. Further, the control module 101 can be configured and constructed similar to known control modules and include a processor, memory, etc. to facilitate and control the operation of the power supply. Such control modules are known and need not be described in detail herein.

Further, as shown the key lock port 200 is coupled to the control module 101 such that the control module recognizes whether or not the key 201 is inserted in the port 200 and recognizes aspects of the key that unlocks certain functionalities or otherwise dictates operations of the power supply. That is, in some embodiments, not only is the coupling between the control module 101 and the port 200 one where the control module 101 recognizes the presence or absence of the key but also can have a communication link to allow for the exchange of information between the control module and the key. This will be discussed further below.

As shown, the wire feeder 140 contains a controller module 121 which is used to facilitate communication with the power supply 110. The controller module 121 contains/is coupled to a user interface control board 126 which allows a user to input user/welding data to the wire feeder 140 to control operation of the system 100. The user interface 126 can be configured like any known user interface, and can include a data screen (LED, etc.) user controls (knobs, buttons, etc.) and/or a touch sensitive input screen. Any known user interface configuration can be utilized. In some embodiments, the user interface controls 126 need not be a part of the communication module, but the user input is at least coupled to the communication module to allow for the user input data to be communicated as discussed herein. The controller module 121 also includes a receiver 129 which is coupled to one of the wire feeder studs 113/114 which are coupled to one of the welding power lines 130 via a voltage sense lead 128. (While only one sense lead is shown, sense leads to each of the studs can be used to detect voltage at the studs). As explained further below, the voltage sense lead 128 is used to sense a voltage communication signal from the power supply 110. The controller module 121 also contains a communication module 123 having a transmitter 125 and a current sink circuit 127 which is used to vary the current draw in the wire feeder 140 to facilitate communication with the power supply 110. This is explained further below. Of course, the wire feeder 140 can have other systems and components, such as motors, motor controls, etc. which are known and need not be shown or described for clarity. The controller module 121 can also have a processor, memory, etc. consistent with known controller modules to ensure the proper operation of the wire feeder 140.

Again, similar to the power supply the wire feeder 140 can have a key lock port 210 which is coupled to the communication module, which can include a controller, processor, memory and the like. That is, the communication module/controller 121 can be used to communicate control inputs to the power supply and control the operation of the system. Again, in exemplary embodiments the communication module/controller 121 is capable of recognizing the presence or absence of a key 211 and/or capable of communication and/or exchanging information with the key 211 via port 210.

As is generally known, the wire feeder 140 can receive its control and operational power from the power supply 110 via the cables 150. This operational power can be in the form of output voltage from the power supply 110 having an OCV voltage of about 60 volts (for example), and a power of about 50 watts (for example). (It is noted that while the power signal is referred to as an OCV signal, there is some current flowing due to the fact that the power signal from the power supply 110 is being used to power the auxiliary circuits in the wire feeder). When the wire feeder 140 is powered up, it can receive user inputs via the user interface controls 126. Communication between the power supply, wire feeder, pendant and/or user interface can be accomplished by any known methods, and exemplary embodiments are not limited by the means of communication. For example, any wired or wireless communication protocol or methodology can be used, including digital communication links.

Figure 3:
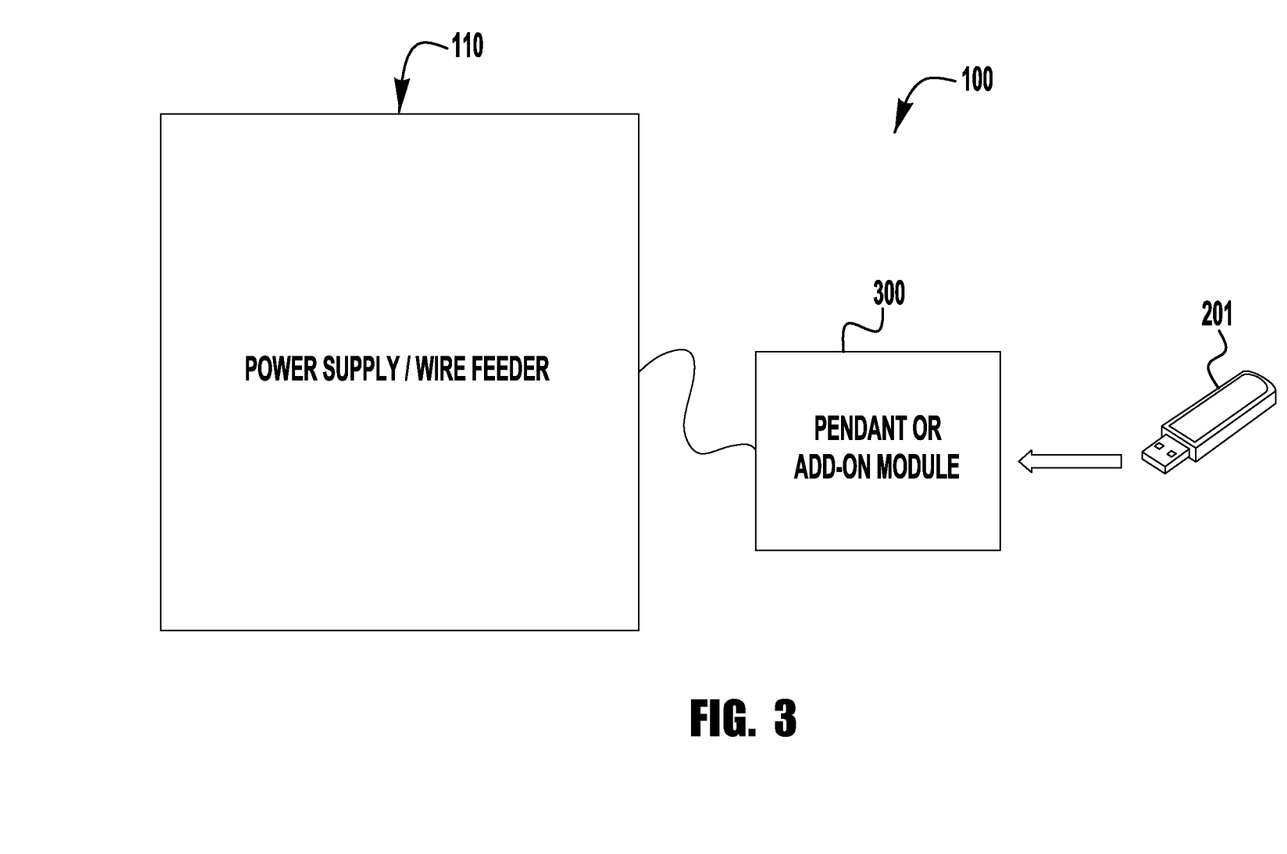
FIG. 3 illustrates a diagrammatical representation of an exemplary embodiment of a power supply configuration of the present invention with a pendant or add-on peripheral device.

FIG. 3 depicts an embodiment of the system where the key 201 can engage with a pendant or add-on module 300 that is coupled to either the power supply or wire feeder. As explained above, some welding/cutting systems can be controlled by the use of a pendant 300. Because the use of a control pendant 300 is well known, its details will not be discussed herein. Thus, in some embodiments, the key lock port can be located on the control pendant to receive the key 201 to allow for the control of the system as described later herein. Further, in some exemplary systems, rather than a pendant the system 100 can use an add-on-module having a key lock port for the key 201, where the add-on module is coupled to a power supply/wire feeder that does not have a port to receive the key. For example, this add-on module will allow the advantages of the present invention to be realized on older welding/cutting systems without the need for replacing or retrofitting the power supply/wire feeder. That is, the add-on-module is capable of being coupled to an existing power supply/wire feeder via either a USB or other type of communication port, or in some embodiments can be able to communicate wirelessly with existing/older power supplies. The add-on module 300 can then receive the key and communicate to the power supply/wire feeder that the key 201 is present or absent and communicate any other information from the key 201 as needed. Embodiments of the present invention are not limited by the construction of the add-on module or its method of communication with the power supply/wire feeder. However, in some embodiments the add-on module can be constructed similar to a pendant control module and be coupled to the power supply/wire feeder using a similar coupling mechanism and control methodology.

Figure 4A:
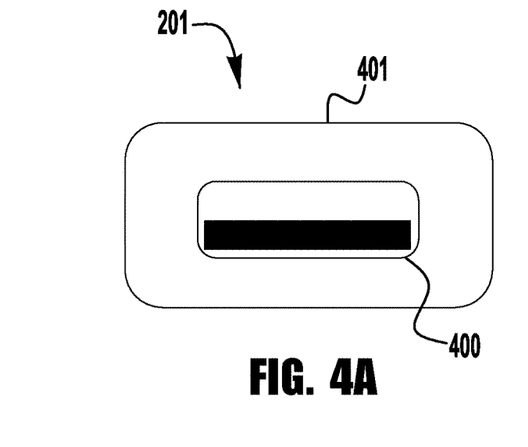
FIGS. 4A-4D illustrates diagrammatical representations of exemplary physical keys of the present invention.

FIGS. 4A through 4D depict exemplary embodiments of the physical key that can be used in embodiments of the present invention. In some exemplary embodiments, the key 201 can have a USB type construction such that the key 201 can store/provide data to the welding/cutting system, which will be discussed further below. In FIG. 4A the key 201 has an electronic connection 460, such as a USB type connection (for example), and a housing 401. To be clear, embodiments of the present invention are not limited to using USB type data connections, but can use any other type of known data connection. Further, in some embodiments, the shape of the housing 401 is not limiting. However, in other embodiments the housing 401 can have a shape that interlocks or otherwise fits with the key lock port to firmly hold the key in place during operation and prevent inadvertent damage or removal. Further, in other exemplary embodiments, the housing of the key can have a particular shape that ensures the key is used with the appropriate power supply and/or is used to unlock or lock out operational features. For example, as shown in each of FIGS. 4B through 4D, the key housing 401 has at least one, or a plurality of, protrusion(s) 411/412 which can engage with the port on the power supply/wire feeder. Of course, embodiments of the present invention are not limited to the housing or key shapes described herein, which are intended to be exemplary. In some embodiments, the shape of the key housing is used to ensure that the proper key is used for the proper power supply/wire feeder. That is, the shape of the key is used to prevent improper use/insertion. However, in other exemplary embodiments the shape of the key 201 (for example with the protrusions 411/412) is used to unlock or lock certain features.

Figure 4B:
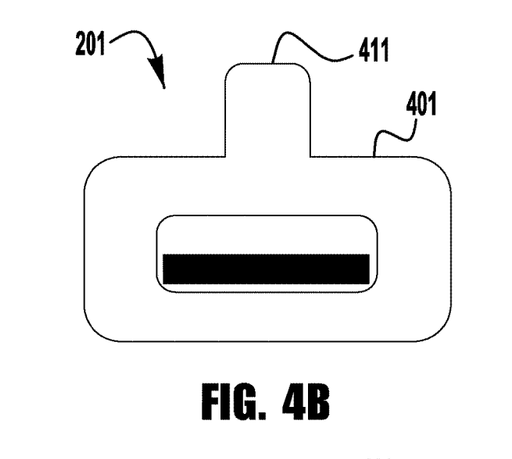
Figure 4C:
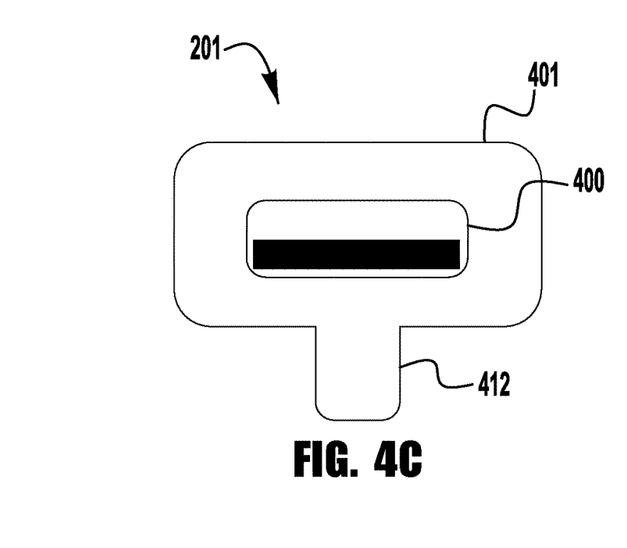
Figure 4D:
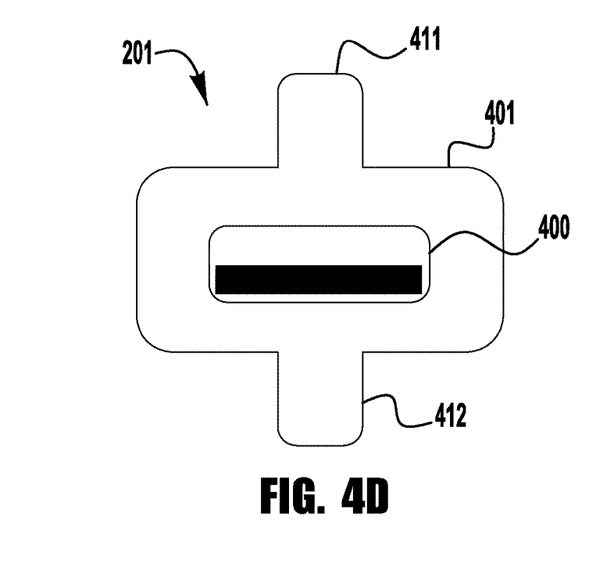

Further, in some embodiments the key lock port on the power supply/wire feeder can have a micro-switch or micro-switches in the opening that engage with the projections 411/412 to control an operation of the system. For example, a key lock port can be configured to receive any one of the four keys shown in FIGS. 4A through 4D. When the key shown in 4A is inserted, none of the micro-switches are engaged. The controller of the power supply/wire feeder recognizes that none of the micro-switches are engaged and because of this limits the operation of the system to a first configuration. For example, this key configuration limits the system for only MIG welding, and no other operation can be used. Then, when the key in FIG. 4B is inserted only the upper micro-switch is engaged and all operations are locked out except for TIG welding. The key in 4C engages a different micro-switch with the protrusion 412 and thus unlocks a third operation. Finally, the key in FIG. 4D would unlock a fourth type of operation, for example plasma cutting.

Further, while the key shapes can be used to lock or unlock a type of operation, the system can be programmed or controlled such that the shape of the key can unlock very specific parameters, or be programmed to unlock or enable only a single type of welding operation. For example, a first key shape (e.g., 4A) can be used to unlock all possible welding/cutting parameters of the system That is, one key shape can be used to allow for the full capabilities of a system to be used. However, the system can be programmed/configured such that the second key shape (e.g., 4B) unlocks only one welding operation, where the parameters are predetermined and locked. For example, the second key shape can be used to unlock only MIG welding, where the MIG welding operation has a specific current waveform, voltage, current and/or frequency parameters. This can also be trues for other key shapes, such as that shown in FIGS. 4C and 4D. Thus, in some embodiments, the control module of the power supply or controller of the system can be programmed, by a user, to use the different key shapes to lock or unlock different types of functions or operations, or can be programmed such that for any one key shape only a specific operation is made available. Thus, a supervisor can use the keys, given to respective welders, to control the welding/cutting processes being done.

It is noted, that in other exemplary embodiments of the present invention the key 201 need not have a USB or other electronic or data transfer connection. That is, in some embodiments the key can simply be structural keys that unlock certain features but do not otherwise have any communication or data capability. In this embodiments, different physical keys lock or unlock different operations. The keys can be plastic, metal or any other type of material. Further, the keys can have a magnetic portion (not shown) that aids in holding the key in place within the key lock port.

As explained previously, because of the operational flexibility and capabilities of current complex welding and cutting systems, operators have a wide range of options and settings available to them. It is often desirable for supervisors, etc. to be able to limit the operational limits or types of welding/cutting that each operator is using. This aids in preventing mistakes or improper changes to a desired weld schedule. Thus, embodiments of the present invention allows for one or more keys to be used to unlock certain weld schedules, weld types or weld parameters and/or allows for certain functions and processes to be locked out—to prevent from being used. Further, embodiments of the present invention allow for the customization of what features, parameters, operations can be locked or unlocked by a given key. This can be done via the user interface on the power supply and/or wire feeder or by another computer system that can be coupled to the power supply/wire feeder.

In some exemplary embodiments, the weld system can be programmed such that no operation of any kind can be commenced without the presence of a physical recognized key. That is, without the recognition of an inserted key, no user can operate the system. This can ensure that the system is being used by an authorized user in an authorized way.

Further, as explained above the key 201 can contain electronic information and/or storage. For example, the key 201 can be configured similar to a USB type device. Such embodiments allow for increased flexibility of the control of any given operation. That is, the key can be programmed with any given weld operation parameters, limits, etc. which can be used by the power supply/wire feeder to control the weld operation. For example, for a given welding operation a supervisor can couple the key to a computer, welding system, etc. and download a set of weld parameters, weld type, etc. for a given welding operation. The computer can be any type of computer/control system to which the key can be coupled and which can transfer data onto the key to be used as described herein. Then the operator takes the programmed key to a weld system and plugs the key in. The power supply/wire feeder recognizes the insertion of the key and reads the data on the key, and uses the read data to set up and lock the parameters for a given welding operation, weld sequence. Exemplary embodiments allow the key to be programmed in any desirable and to control any desired parameters. For example, in addition to being programmed to lock or unlock functions, or to set up the welding system for a given welding operation, including welding process parameters, the key can be programmed to only permit a set number of welding operations, or unlock the welding system for a given period of time. For example, a supervisor may determine that only 10 welding jobs with a given set of parameters should be done. As such, the key then only unlocks the welding system for 10 welding operations and use of the system will not be permitted after the 10 are completed. Of course, other possible control structures can be implemented and embodiments of the present invention are not limited in this way.

In further exemplary embodiments, each key can receive a store information from the welding/cutting system. That is, in addition to providing operation information to the system, the key can receive and store information from the system. For example, the key can store operational information such as arc time, the number of welding events, start and stop times, the existence of any anomalies during a given welding operation etc. Embodiments are not limited this way and the key can be used to capture and store any desired information. This can be used for training purposes, and/or track the performance of a given welder during given welding operations. This can also be used to track productivity and/or performance of a given operator and/or can be used to track the productivity, efficiency and reliability of a given welding system, power supply and/or wire feeder. For example, in some exemplary embodiments, the key can be used to store information regarding the use and/or performance of any component of a welding system and be used to track and store information related to faults, errors and/or general maintenance and service. As a non-limiting example, it may be understood for a given manufacturing facility or operation that certain parts, such as weld cable liners, have a usable operational life (for example weld cable liner). The system described herein, including the key, can track the hours of operation and then provide the user/supervisor, etc. an indication regarding the remaining usable life to indicate to the user whether or not replaced meant necessary. Additionally, in some embodiments the key can store an error signal or error event from a previous welding operation, and when the key is re-inserted into the same welding system the system controller can read from the key that an error had been previously recorded and then notify the user of the error and/or require that the error be cleared or addressed prior to a subsequent operation being authorized.

Further, in exemplary embodiments the keys can be identified for a specific user. That is, in some embodiment each key is personalized to a given user. This ensures that, regardless of which system the key is plugged into, the user will be limited as desired and as programmed on the key.

This can prevent users from being allowed to use different systems that they are not permitted to use, are not qualified for etc. Further, this can allow a supervisor to collect and track individual user performance.

In even further embodiments, the key can be a "single use" or limited use key that tracks and stores information regarding a welding operation. For example, in some applications it may be desirable to track and store and welding data for a given project, either temporarily or permanently. This could be advantageous in very high importance welding projects. For example, in some of such embodiments, a key can be used for only 10 welding operations, which it unlocks. For each of the 10 welding operations the key stores information including operator identification information, date, weld start time, stop time, current and voltage peaks, heat input, the existence of any anomalies (e.g., significant shorting events), or any other parameters or combination of parameters that are desired to be maintained. Once the 10th welding operation is completed the key stores the last of the information and cannot be reused. The supervisor can then take the key and upload and/or review the stored information, which can be kept indefinitely. This data can be uploaded to any computer system, network, data storage facility or the like. Thus, the weld data can be reviewed for any potential issues that may require a further inspection and/or stored indefinitely until such time review of the data could be needed. Of course, the key can be configured to lock unlock for any number of operations, and need not be limited to 10 operations. Further, the key can be programmed to be usable for a given amount of time or for a specific date. That is, a key can be used for one day (or a defined period of time) to unlock certain welding/cutting operations and after the expiration of the desired time frame the key does not unlock any further operations. Again, the key can store whatever is needed or desired for the duration it is used. In exemplary embodiments the keys can be re-usable but can only be re-used after the stored data is captured and stored. For example, at the end of a work day the supervisor can capture the data from the key onto some other computer system, and upon successful capture of the data, the supervisor can then reset the key to be usable again.

In other embodiments, the key is not needed to use or otherwise operate the welding/cutting system, but the key is needed to make changes or to unlock certain features as discussed above. Thus, in these embodiments a user could use the system without a key for any desired functionality so long as that functionality does not require the key to unlock it. However, if the user wishes to depart from the permitted parameters/weld types, etc. the user must insert the key to permit the desired change.

Thus, embodiments of the present invention allow for the detailed control of welding and cutting operations, with the added security of a physical key.

Figure 5:
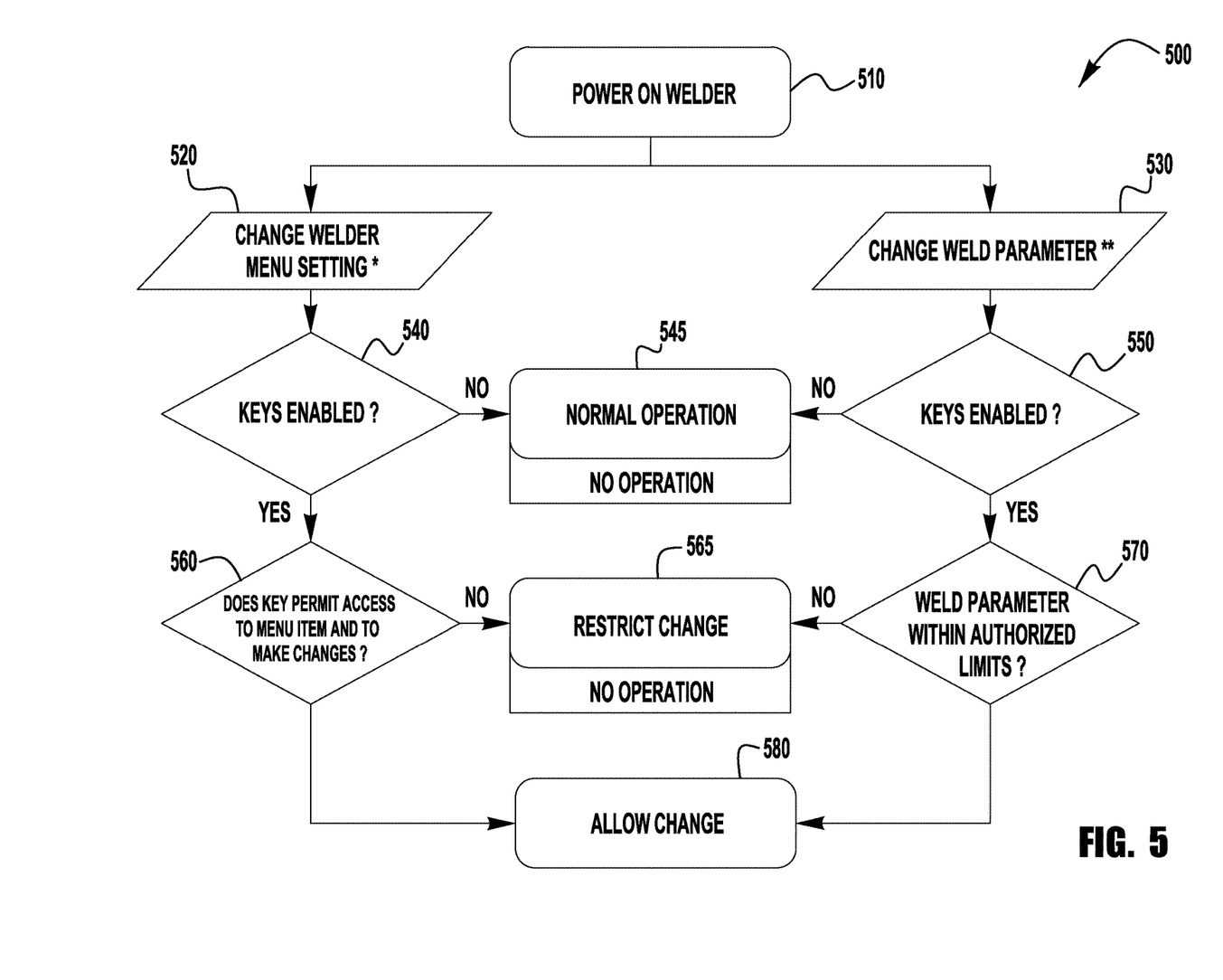
FIG. 5 illustrates a diagrammatical representation of an exemplary flow chart for the present invention.

FIG. 5 shows an exemplary flow chart 500 that can be used with embodiments of the invention consistent with the descriptions discussed above. Of course, this operational flow is exemplary and representative and is not limiting. In this embodiment, the power supply or system does not require the initial insertion of a key before being turned on 510. Then the user either attempts to change a weld menu setting 520 or a weld parameter 530. Upon the attempted changes 520/530 the system checks to see if the key is present and enables or authorizes the requested inputs/changes 540/550. If the needed key is not present the system can either allow the permitted operations 545, and ignore the requested changes, or simply lock out any use and not permit any operation. If the key is present, the system them determines if the requested change is within the authorized limits for the changes 560/570. If the key unlocks all functionality then all changes would be authorized. However, the key may only permit certain changes and so the system determines if the requested change is within the allowed scope. If the change is permitted, then the change is allowed 580. However, if the change is not permitted the change can be restricted to an allowed parameter change or, again, no operation could be permitted 565. As indicated previously, other steps and processes can be implemented without departing from the scope or spirit of the present invention. For example, data can be stored as described above.

Additionally, in exemplary embodiments the user interface on anyone of the power supply, wire feeder and/or pendant can display the key status to a user. For example, a status of key insertion can be displayed as well as the restrictions that are in place with or without the key. Further, with the key inserted the user interface can display the process limits, parameters etc. and can indicate to a user when a desired operation or parameter is outside of the authorized scope.

Further, in other exemplary embodiments, the attempt to use a welding/cutting system outside of permitted parameters or without a key can be reported to a central computer for review and/or authorization. For example, it is known that welding cutting systems can be networked to each other and to a central computer station. In such situations, a welding/cutting power supply can report to the central computer that an unauthorized change or use has been attempted. From the central station the supervisor could then authorize the change and/or stop any operation until the situation is made clear.

Of course, other applications and uses can be used for embodiments of the present invention that are not expressly set forth herein.

Method steps can be performed by one or more programmable processors executing a computer program to perform functions of the invention by operating on input data and generating output. Method steps can also be performed by, and apparatus can be implemented as, special purpose logic circuitry, e.g., an FPGA (field programmable gate array) or an ASIC (application specific integrated circuit). Modules can refer to portions of the computer program and/or the processor/special circuitry that implements that functionality.

Processors suitable for the execution of a computer program, including the communication protocols discussed herein, include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, (e.g., magnetic, magneto-optical disks, or optical disks). Data transmission and instructions can also occur over a communications network. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD- ROM and DVD-ROM disks. The processor and the memory can be supplemented by, or incorporated in special purpose logic circuitry.

To provide for interaction with a user on the wire feeder and/or the power supply, the above described techniques can be implemented on a CNC or computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The above described techniques can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an example implementation, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

Comprise, include, and/or plural forms of each are open ended and include the listed parts and can include additional parts that are not listed. And/or is open ended and includes one or more of the listed parts and combinations of the listed parts.

As stated above, although the majority of the discussion in the present application has been discussed within the context of welding power supplies and wire feeders, these discussions were exemplary. In other words, while the invention has been particularly shown and described with reference to exemplary embodiments thereof, the invention is not limited to these embodiments. It will be understood by those of ordinary skill in the art that various changes in form and details may be made therein without departing from the spirit and scope of the invention as defined herein.

We claim:

1. A welding or cutting system, comprising:
    a power supply which receives an input power signal and configured to output at least one of a first welding or cutting signal and a second welding or cutting signal which is different from said first welding or cutting signal,
    a controller circuit coupled to said power supply controls operation of said power supply and configured to control said power supply to output said first and second welding or cutting signals;
    a key port coupled to said controller circuit; and
    a removable key configured to be received into said key port;
    wherein said controller circuit is configured to recognize an absence and a presence of said key in said key port and based on said recognition of said absence of said key said controller circuit disables an ability of said system to output said second welding or cutting signal, and based on said presence of said key said controller circuit enables an ability of said system to output said second welding or cutting signal,
    wherein said removable key stores one or both of a predetermined number of welding operations and a predetermined welding time period, and the controller circuit is configured to disable output of the welding power supply upon completion of the predetermined number of welding operations or expiration of the predetermined welding time period.

2. The system of claim 1, wherein said system comprises at least one of a remote pendant control and a wire feeder which is coupled to said controller circuit and said key port is located on one of said remote pendant control or said wire feeder.

3. The system of claim 1, wherein said system comprises at least one of a wire feeder and a remote control pendant coupled to said power supply and said controller circuit and at least one of said wire feeder and remote control pendant comprises a second key port coupled to said controller circuit, where each of said key port and said second key port are configured to receive said removable key.

4. The system of claim 1, wherein said key is a USB device.

5. The system of claim 1, wherein said power supply is configured to output a plurality of different current waveform types and based on said recognition of said absence of said removable key said controller circuit disables an ability of said power supply to output at least one of said different current waveform types.

6. The system of claim 1, wherein said removable key stores at least one operational parameter related to at least one welding or cutting operation and said controller circuit controls an output of said power supply based on said stored at least one operational parameter.

7. The system of claim 1, wherein said system is operable in a MIG welding mode or a TIG welding mode, and wherein said key port comprises at least one switch device coupled to said controller circuit, where said switch device is configured to engage with a portion of said removable key when said removable key is inserted into said key port and said controller circuit limit an operation of said system to one of the MIG welding mode and the TIG welding mode based on an engagement between said removable key and said switch device.

8. The system of claim 1, wherein said removable key is configured to store information from said controller circuit related to a completed welding or cutting operation.

9. The system of claim 1, wherein said removable key is configured to store information regarding a user of said system.

10. A welding or cutting system, comprising:
    a power supply which receives an input power signal and configured to output at least one of a first welding or cutting signal and a second welding or cutting signal which is different from said first welding or cutting signal,
    a controller circuit coupled to said power supply controls operation of said power supply and configured to control said power supply to output said first and second welding or cutting signals;
    a key port coupled to said controller circuit; and
    a removable key configured to be received into said key port;
    wherein said controller circuit is configured to recognize an absence and a presence of said key in said key port and based on said recognition of said absence of said key said controller circuit enables an ability of said system to output said second welding or cutting signal, and based on said presence of said key said controller circuit disables an ability of said system to output said second welding or cutting signal, wherein said system is operable in a MIG welding mode or a TIG welding mode, and wherein said key port comprises at least one switch device coupled to said controller circuit, where said switch device is configured to engage with a portion of said removable key when said removable key is inserted into said key port and said controller circuit limits operation of said system to one of the MIG welding mode and the TIG welding mode based on an engagement between said removable key and said switch device.

11. The system of claim 10, wherein said system comprises at least one of a remote pendant control and a wire feeder which is coupled to said controller circuit and said key port is located on one of said remote pendant control or said wire feeder.

12. The system of claim 10, wherein said system comprises at least one of a wire feeder and a remote control pendant coupled to said power supply and said controller circuit and at least one of said wire feeder and remote control pendant comprises a second key port coupled to said controller circuit, where each of said key port and said second key port are configured to receive said removable key.

13. The system of claim 10, wherein said removable key stores a predetermined number of welding operations and the controller circuit is configured to disable output of the welding power supply upon completion of the predetermined number of welding operations.

14. The system of claim 10, wherein said key is a USB device.

15. The system of claim 10, wherein said power supply is configured to output a plurality of different current waveform types and based on said recognition of said absence of said removable key said controller circuit enables an ability of said power supply to output at least one of said different current waveform types.

16. The system of claim 10, wherein said removable key stores at least one operational parameter related to at least one welding or cutting operation and said controller circuit controls an output of said power supply based on said stored at least one operational parameter.

17. The system of claim 10, wherein removable key stores a predetermined welding time period and the controller circuit is configured to disable output of the welding power supply upon expiration of the predetermined welding time period.

18. The system of claim 10, wherein said removable key is configured to store information from said controller circuit related to a completed welding or cutting operation.

19. The system of claim 10, wherein said removable key is configured to store information regarding a user of said system.

* * * * *